United States Patent
Ahmed et al.

(10) Patent No.: US 11,598,187 B1
(45) Date of Patent: Mar. 7, 2023

(54) MEMBRANE-BASED SYSTEMS AND METHODS FOR INCREASING THE MASS TRANSFER RATE OF DISSOLVED GASES

(71) Applicant: Saudi Arabian Oil Company, Dhahran (SA)

(72) Inventors: Zeyad Tareq Ahmed, Chassell, MI (US); Serguey Viktorov Arkadakskiy, Alberta (CA); Noushad Kunnummal, Louisville, KY (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/573,210

(22) Filed: Jan. 11, 2022

(51) Int. Cl.
*E21B 43/16* (2006.01)

(52) U.S. Cl.
CPC .......... *E21B 43/164* (2013.01); *E21B 43/166* (2013.01)

(58) Field of Classification Search
CPC ............................ E21B 43/164; E21B 43/166
See application file for complete search history.

(56) References Cited

U.S. PATENT DOCUMENTS

| | | | | |
|---|---|---|---|---|
| 7,854,261 | B2 * | 12/2010 | Woie | E21B 43/385 166/266 |
| 9,316,093 | B2 * | 4/2016 | Dusseault | E21B 41/0064 |
| 11,155,462 | B2 | 10/2021 | Arkadakskiy et al. | |
| 2003/0047310 | A1 * | 3/2003 | Thomas | E21B 43/164 166/265 |
| 2010/0326924 | A1 * | 12/2010 | Georgiou | E21B 41/0064 210/768 |
| 2014/0020388 | A1 | 1/2014 | Salazar et al. | |
| 2014/0130498 | A1 * | 5/2014 | Randolph | E21B 43/24 166/267 |
| 2018/0264399 | A1 | 9/2018 | Deng et al. | |

FOREIGN PATENT DOCUMENTS

EP    3868461 A1    8/2021

OTHER PUBLICATIONS

Gislason et al., "A brief history of CarbFix: Challenges and victories of the project's pilot phase", Energy Procedia, vol. 146, pp. 103-114, 2018.
Gunnarsson et al., "The rapid and cost-effective capture and subsurface mineral storage of carbon and sulfur at the CarFix2 site", Int. J. Greenhouse Gas Control, vol. 79, pp. 117-126, 2018.
Snaebjornsdottir et al., "Mineral Storage of CO2: Carbon dioxide storage through mineral carbonation", Nat Rev Earth Environ, vol. 1, pp. 90-102, 2020.
Syron et al., "Reducing the energy consumption of aerobic sewage treatment by removing the bubbles", 2nd IWA Specialized International Conference ecoSTP2014 EcoTechnologies for Wastewater treatment Technical, Environmental & Economic Challenges, Verona, Italy, Jun. 23-27, 2014.

* cited by examiner

Primary Examiner — Silvana C Runyan
(74) Attorney, Agent, or Firm — Dinsmore & Shohl LLP

(57) ABSTRACT

This disclosure relates to membrane-based systems for transporting dissolved gases to a formation and methods for increasing a mass transfer rate of gases in a formation. The membrane-based system may include an aqueous injection well, a diffusion-based membrane, a gas, and an aqueous solution.

19 Claims, 3 Drawing Sheets

US 11,598,187 B1

MEMBRANE-BASED SYSTEMS AND METHODS FOR INCREASING THE MASS TRANSFER RATE OF DISSOLVED GASES

FIELD

Embodiments disclosed herein generally relate to gas dissolution, and more specifically, to membrane-based gas dissolution.

TECHNICAL BACKGROUND

Sequestration of gases is desired in a variety of applications including, but limited to, reduction of greenhouse gases and gas storage. Depositing dissolved gas solutions within a formation may require drilling a hole from the surface to the geological formation. Specialized drilling techniques and materials are utilized to form the wellbore hole and enable the injection of dissolved gas solutions into the formation. Specialized materials may be used to transport dissolved gas into a well. A wellbore is a hole that extends from the surface to a location below the surface to permit access to formations. The wellbore contains at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. The fluid conduit may be defined by one or more tubular strings, such as casings, inserted into the wellbore and secured in the wellbore.

SUMMARY

Carbon sequestration in reactive formations involves the injection of carbon dioxide ($CO_2$) rich water, which is produced either by water scrubbing $CO_2$ from complex gas mixtures or through bubble aeration of pure $CO_2$ in carrier water inside an injection well. However, these processes often fail to achieve optimal $CO_2$ saturation in the dissolved gas solution. An ongoing need exists for increasing the gas concentration of solutions within an aqueous solution injection well and increasing the mass transfer rate of dissolved gases into a formation.

These needs are met by the embodiments of the membrane-based system and methods for increasing the mass transfer rate of gas into a formation disclosed herein. One or more embodiments disclosed herein provide a membrane-based system that may include an aqueous solution injection well, a diffusion-based membrane, a gas from a gas source, and an aqueous solution from an aqueous solution source. The membrane-based system may include transporting dissolved gases to a formation. The membrane-based system may also further comprise a gas return pipe that enables the monitoring of the insoluble or undissolved gases flowing to the surface from the membrane-based system. These membrane-based systems may also be used in methods to increase the mass transfer rate of a gas into a formation. In one or more embodiments, the mass transfer rate of a gas into a formation may be increased by monitoring the undissolved gas returned to the surface from the gas return pipe and changing the gas and aqueous solution flow conditions of the membrane-based system.

In one or more embodiments, a membrane-based system for transporting dissolved gases to a formation may include an aqueous solution injection well within the formation, a diffusion-based membrane comprising a gas portion and a liquid portion, a gas from a gas source, and an aqueous solution from an aqueous solution source. The aqueous injection well may include a cased portion and an open hole interval portion. Fluids within the aqueous solution injection well may flow out of the aqueous solution injection well and flow into the formation through the open hole interval portion. A gas pump may transport the gas into the gas portion of the diffusion-based membrane and the gas may be concentrated in the gas portion of the diffusion-based membrane to form a concentrated gas. A water pump may transport the aqueous solution into the cased portion of the aqueous solution injection well. At least a portion of the aqueous solution may enter the liquid portion of the diffusion-based membrane. At least a portion of the concentrated gas may flow out of the gas portion of the diffusion-based membrane and may flow into the liquid portion of the diffusion-based membrane. At least a portion of the concentrated gas may be dissolved in the aqueous solution to form a dissolved gas solution within the liquid portion of the diffusion-based membrane, and the dissolved gas solution may flow out of the liquid portion of the diffusion-based membrane and into the formation.

This summary is provided to introduce a selection of concepts that are further described in the detailed descriptions. This summary is not intended to identify key or essential features of the claimed subject matter, nor is it intended to be used as an aid in limiting the scope of the claimed subject matter.

Other aspects and advantages of embodiments disclosed herein will be apparent from the following description of drawings and detailed description made with reference to the accompanying appended claims.

DETAILED DESCRIPTION

Figure 1:
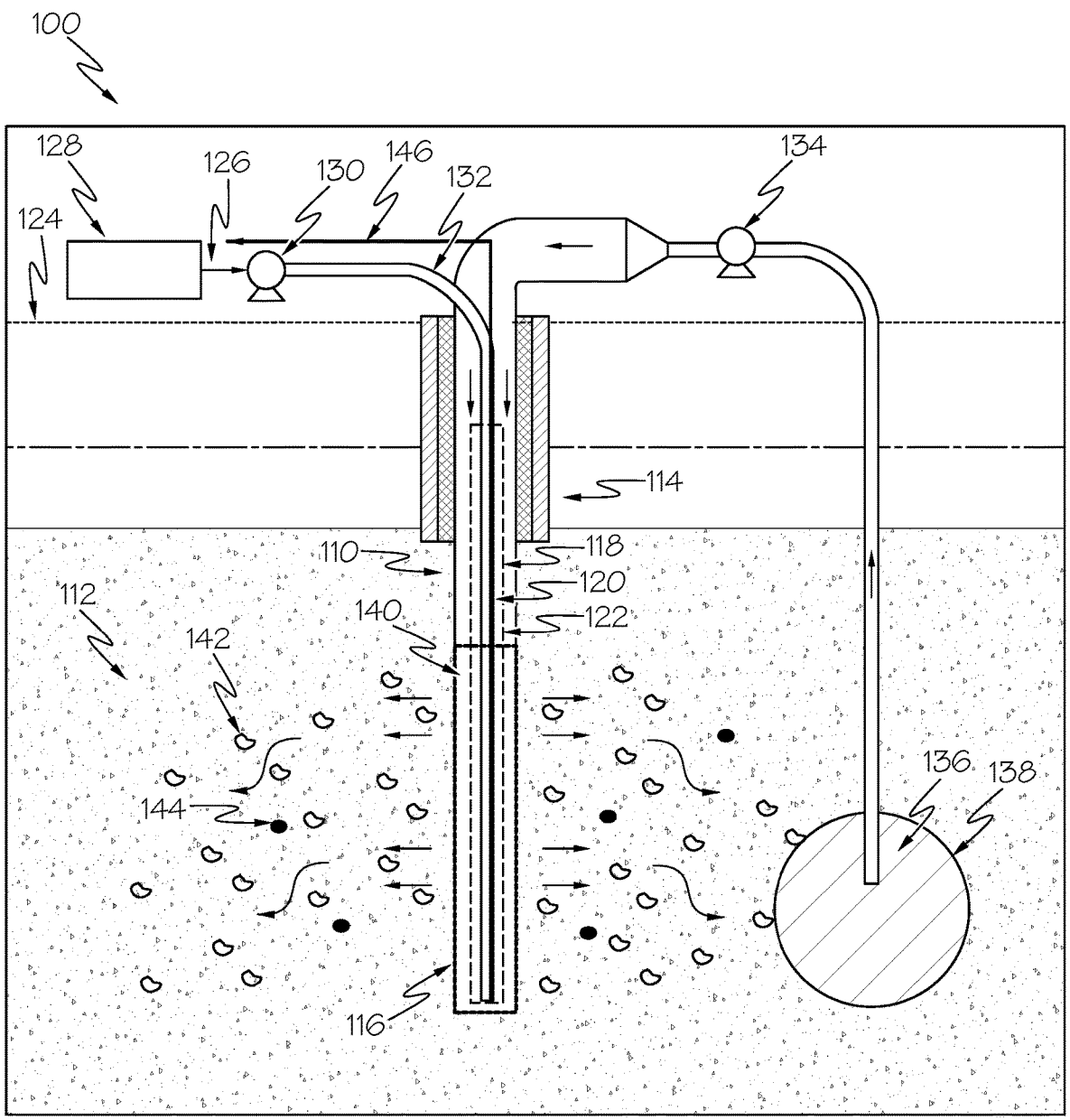
FIG. 1 is a schematic diagram of an embodiment of a membrane-based system, as described herein.

Embodiments disclosed herein provide membrane-based systems for increasing gas dissolution efficiency. More specifically, some embodiments herein are directed to membrane-based systems for transporting dissolved gases to a formation, and methods of increasing a mass transfer rate of a gas into the formation using said membrane-based systems. In particular, some embodiments herein are directed toward membrane-based systems for transporting carbon dioxide ($CO_2$) or other waste gases to a formation, and methods of increasing a mass transfer rate of $CO_2$ or other waste gases into a formation using said membrane-based systems. In one or more embodiments, selective membranes are used, which may significantly enhance the mass transfer rate of gases into an aqueous solution, and therefore optimize the economics of solubility trapping and mineral trapping of $CO_2$ and other water-soluble waste gases.

Some mass transfer technologies currently used to produce dissolved $CO_2$ water mixtures injected in reservoirs include water scrubbing of $CO_2$-bearing gas mixtures (e.g. flue gas) at surface or bubble aeration of pure $CO_2$ in carrier water performed inside the casing of an injection well. Scrubbing of $CO_2$ involves pressurizing both the gas mixture and carrier water and letting those mix in a countercurrent mode inside a vertical scrubbing tower with water soluble gases such as $CO_2$, $H_2S$, and $SO_2$ dissolving in the water, while insoluble gases such as $N_2$ collect at the top of the vertical scrubbing tower and are vented to air. Aeration, on the other hand, involves the release of pure $CO_2$ bubbles in a downward stream of carrier water where $CO_2$ is dissolved prior to entering the storage reservoir. Because the solubility of $CO_2$ in water is mostly pressure dependent, much of the cost of carbon sequestration is related to compressing the $CO_2$ and/or carrier water before mixing. For example, the theoretical weight ratio of $H_2O$ to $CO_2$ in a $H_2O$-pure $CO_2$ mixture at 20 to 30 bar is approximately 22 tons:1 ton to 33 tons:1 ton. Therefore, most of the cost associated with carbon sequestration in rock formations is related to the cost of gas/water compression. The inefficient mass transfer of $CO_2$ to water caused by the less than optimal mass transfer effectiveness of conventional processes such as scrubbing or aeration could add significantly to the costs, because of the need for pumping more water to deliver the same amount of $CO_2$ and needing a larger number of injection wells. In addition, even minor pressure changes during bubble aeration inside the wells could result in accidental gas build up and operational issues. Therefore, any process that could improve the effectiveness of $CO_2$ dissolution, may significantly improve the economics of carbon sequestration in rock formations.

In one or more embodiments, the membrane-based system may include an aqueous solution injection well. In one or more embodiments, the membrane-based system may include a diffusion-based membrane. which may receive gas and an aqueous solution. The gas may be dissolved in the aqueous solution to form a dissolved gas solution, and the dissolved gas solution may be transported to a formation. In one or more embodiments, the membrane-based system may be used to increase the mass transfer rate of gases into a formation. In one or more embodiments, the gas is $CO_2$. The membrane-based system, according to embodiments herein, may increase the dissolution of a gas in an aqueous solution.

As used throughout this disclosure, the term "aqueous solution injection well" may refer to a bored well within a formation capable of receiving injection water or other aqueous solutions. The aqueous solution injection well may be vertical, horizontal, or positioned at any angle within the formation. A wellbore forms a pathway capable of permitting both fluids and apparatus to traverse between the surface and the formation. Besides defining the void volume of the wellbore, the wellbore wall also acts as the interface through which fluid can transition between the subterranean formation and the interior of the well bore. The wellbore wall can be unlined (that is, bare rock or formation) to permit such interaction with the formation, lined, such as by a tubular string, so as to prevent such interactions, or may be partially lined with an open hole interval portion, so as to allow interaction with the formation.

As used throughout this disclosure, the term "formation" refers to a body of rock that is sufficiently distinctive and continuous that it can be mapped, and may include a rock formation, a rock reservoir, a reactive rock formation, a reactive rock reservoir, water containing formation, or deep aquifer, among others.

As used throughout this disclosure, the term "cased portion" may refer to a portion of an aqueous solution injection well, wherein fluids cannot penetrate the walls to reach the formation.

As used throughout this disclosure, the term "open hole interval portion" may refer to a portion of an aqueous solution injection well, wherein fluids can travel out of the aqueous solution injection well and into the formation.

As used throughout this disclosure, the term "diffusion-based membrane" may refer to a membrane wherein gases, liquids, other fluids, or combinations thereof may travel out of the membrane when the concentration of the soluble gases is greater inside the membrane compared to outside of the membrane. In one or more embodiments, the diffusion-based membrane may utilize a single-component membrane, a selective multicomponent membrane, or combinations thereof.

As used throughout this disclosure, the term "gas" may refer to any gas or combination of gases including, but not limited to, $CO_2$, $H_2S$, $SO_2$, $N_2$, $Ar_2$, $O_2$, and combinations of two or more thereof.

As used throughout this disclosure, the term "pipe" may refer to a pipe, tube, or other enclosed structure within an aqueous solution injection well, through which a fluid may be transported.

As used throughout this disclosure, the term "pressurized flow-through vessel" may refer to an enclosed system capable of housing a membrane and may be configured to receive fluids such as gas or gas mixtures and aqueous solutions.

As used throughout this disclosure, the term "mass transfer rate" may refer to the rate at which a gas may be transported from a gas source into a formation. The mass transfer rate may be influenced by a combination of processes, including but not limited to, advection, diffusion, dissolution, and migration of injected solution into the formation.

As used throughout this disclosure, the term "fluid" may include liquids, gases, or both.

As used throughout this disclosure, the term "gas return pipe" may refer to a pipe within an aqueous solution injection well that is operable to transport a return gas comprising insoluble gases or undissolved gases within the diffusion-based membrane to the surface, and the composition of the return gas above the surface may be monitored, further processed, vented, or combinations thereof.

In one or more embodiments, the aqueous solution may include one or more of deionized, tap, distilled, or fresh waters; natural, brackish, or saturated salt waters; marine waters, natural hydrocarbon formation produced waters, or synthetic brines; filtered or untreated seawaters; mineral waters; treated or untreated wastewater; or other potable or non-potable waters containing one or more dissolved salts, minerals, or organic materials. In one or more embodiments, the aqueous solution may comprise at least 80 wt. %, at least 90 wt. %, at least 95 wt. %, at least 99 wt. %, at least 99.9 wt. % or even 100 wt. % of water.

In one or more embodiments, at least 90 wt. %, at least 95 wt. %, or even at least 99 wt. % of the aqueous mixture by mass may be a brine solution. As used herein, the term "brine" may refer to a saturated solution of one or more alkali metal chlorides. For example, "brine" may refer to a saturated solution of NaCl, KCl, other water soluble salts, or mixtures thereof. Alternatively, the term "brine" may refer to naturally derived saltwater, for example, seawater or salt lake water, used in its natural state or after having undergone processing, such as filtration, to remove contaminants and large particles. In one or more embodiments, the aqueous solution may consist of brine.

Some embodiments disclosed herein are directed to membrane-based systems for transporting dissolved gases to a formation, and methods of increasing a mass transfer rate of a gas in a formation in said membrane-based systems. The membrane-based systems disclosed herein may include an aqueous solution injection well within the formation, a diffusion-based membrane, a gas from a gas source, and an aqueous solution from an aqueous solution source.

In one or more embodiments, the membrane-based system may include an aqueous solution injection well, wherein the aqueous solution injection well may be used to place fluid underground into porous rock formations. In one or more embodiments, the aqueous solution injection well may comprise a cased portion and an open hole interval portion.

Turning now to FIG. 1, a schematic diagram of an exemplary membrane-based system 100 is provided. Specifically, a membrane-based system 100 comprises an aqueous solution injection well 110 within a reactive rock formation 112, wherein the aqueous solution injection well 110 comprises a casing portion 114 and an open hole interval portion 116. A diffusion-based membrane 118 comprising a gas portion 120 and a liquid portion 122 is positioned within the aqueous solution injection well 110 and runs vertically in the well from a position below a surface 124 of the formation 112 within the casing portion 114, and ends near the bottom of the aqueous solution injection well 110 in the open hole interval portion 116. A gas stream 126 from a gas source 128 is transported into the gas portion 120 of the diffusion-based membrane 118 using a gas pump 130. The gas stream 126 travels through a pipe 132 fluidly connected to the gas portion 120 of the diffusion-based membrane 118. A water pump 134 is used to pump an aqueous solution 136 within a well 138 in the formation 112 to the aqueous solution injection well 110. At least a portion of the aqueous solution 136 pumped into the aqueous solution injection well 110 is enters the liquid portion 122 of the diffusion-based membrane 118. The gas from the gas stream 126 is concentrated in the gas portion 120 of the diffusion-based membrane 118 to form a concentrated gas. At least a portion of the concentrated gas flows out of the gas portion 120 of the diffusion-based membrane 118 and flows into the liquid portion 122 of the diffusion-based membrane 118. At least a portion of the concentrated gas is dissolved in the aqueous solution to form a dissolved gas solution 140 within the liquid portion 122 of the diffusion-based membrane 118. The dissolved gas solution 140 then flows out of the liquid portion 122 of the diffusion-based membrane 118 and into the reactive rock formation 112 through the open hole interval portion 116 of the aqueous solution injection well 110. The dissolved gas solution 140 may interact with reactive minerals 142 in the rock formation 112 to form secondary minerals such as, but not limited to, carbonates 144. Additionally, insoluble and undissolved gases in the gas portion of the diffusion-based membrane may be transported to the surface 124 through a gas return pipe 146.

Figure 2:
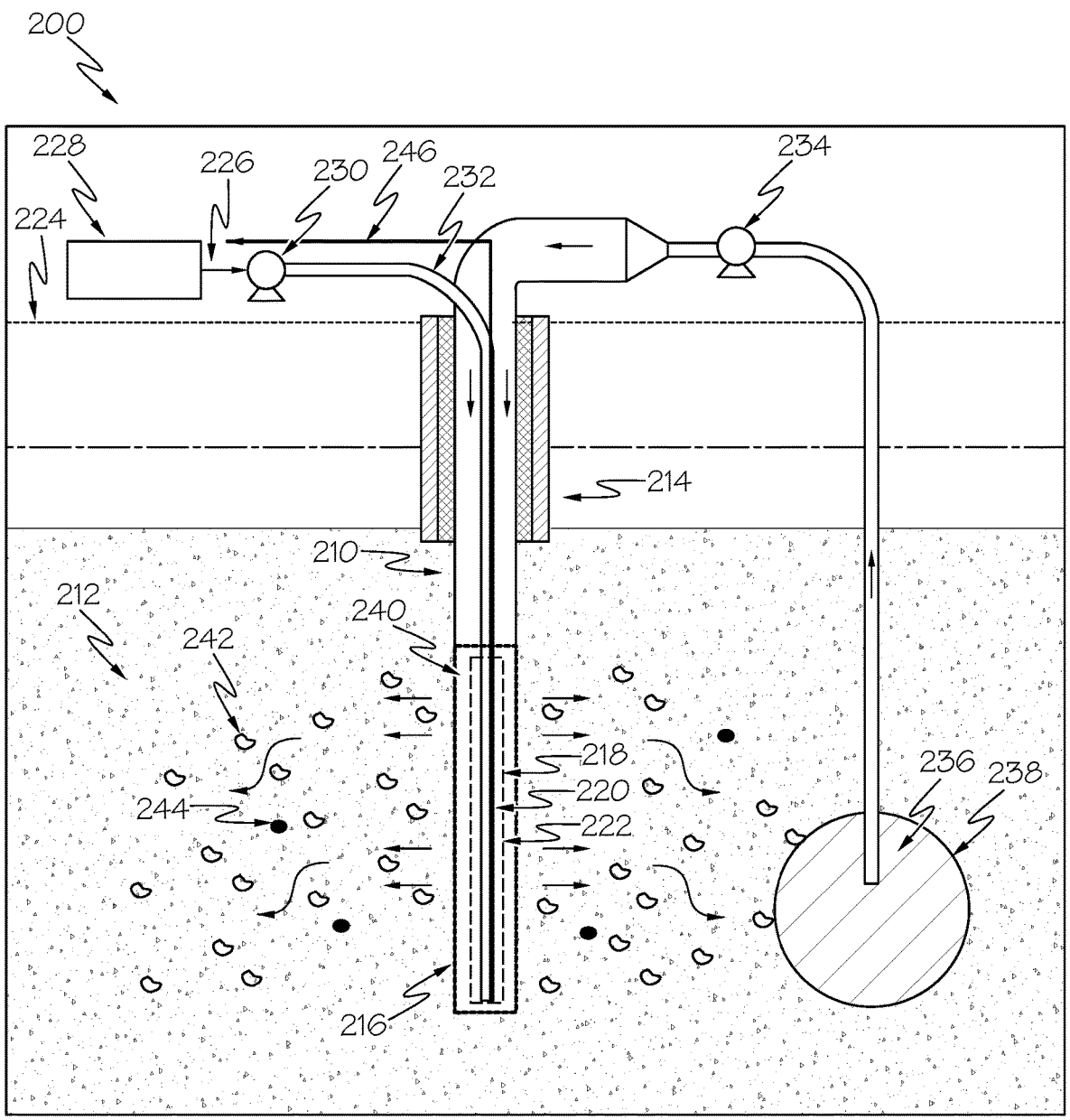
FIG. 2 is a schematic diagram of an embodiment of a membrane-based system, as described herein.

Turning now to FIG. 2, a schematic diagram of an exemplary membrane-based system 200 is provided. Specifically, a membrane-based system 200 comprises an aqueous solution injection well 210 within a reactive rock formation 212, wherein the aqueous solution injection well 210 comprises a casing portion 214 and an open hole interval portion 216. A diffusion-based membrane 218 comprising a gas portion 220 and a liquid portion 222 is positioned within the aqueous solution injection well 210 and runs vertically in the well from a position below a surface 224 of the formation 212 within the open hole interval portion 216, and ends near the bottom of the aqueous solution injection well 210 in the open hole interval portion 216. A gas stream 226 from a gas source 228 is transported into the gas portion 220 of the diffusion-based membrane 218 using a gas pump 230. The gas stream 226 travels through a pipe 232 fluidly connected to the gas portion 220 of the diffusion-based membrane 218. A water pump 234 is used to pump an aqueous solution 236 within a well 238 in the formation 212 to the aqueous solution injection well 210. At least a portion of the aqueous solution 236 pumped into the aqueous solution injection well 210 is enters the liquid portion 222 of the diffusion-based membrane 218. The gas in the gas stream 226 is concentrated in the gas portion 220 of the diffusion-based membrane 218 to form a concentrated gas. At least a portion of the concentrated gas flows out of the gas portion 220 of the diffusion-based membrane 218 and flows into the liquid portion 222 of the diffusion-based membrane 218. At least a portion of the concentrated gas is dissolved in the aqueous solution to form a dissolved gas solution 240 within the liquid portion 222 of the diffusion-based membrane 218. The dissolved gas solution 240 then flows out of the liquid portion 222 of the diffusion-based membrane 218 and into the reactive rock formation 212 through the open hole interval portion 216 of the aqueous solution injection well 210. The dissolved gas solution 240 may interact with reactive minerals 242 in the rock formation 212 to form secondary minerals such as, but not limited to, carbonates 244. Additionally, insoluble and undissolved gases in the gas portion of the diffusion-based membrane may be transported to the surface 224 through a gas return pipe 246.

Figure 3:
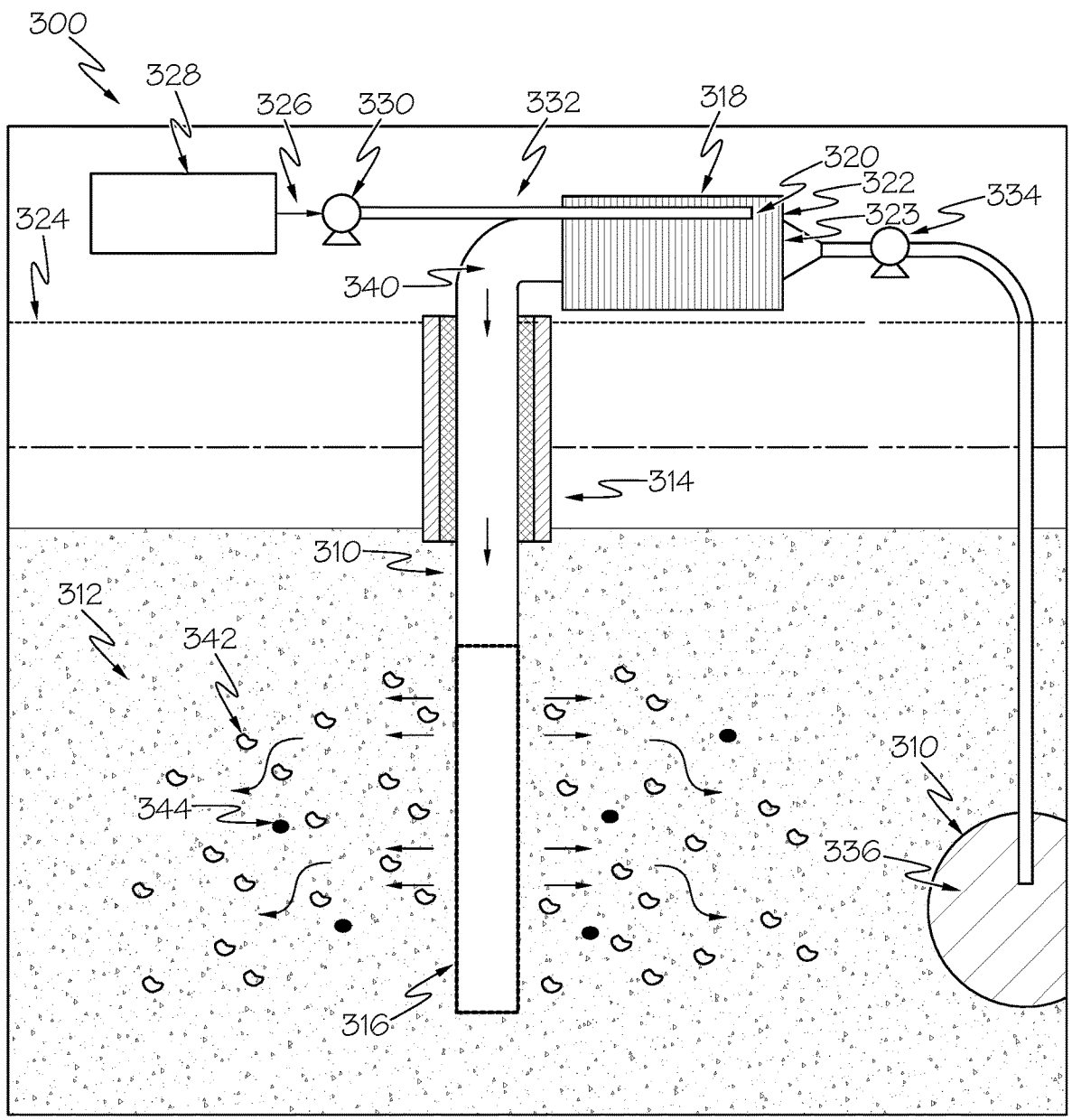
FIG. 3 is a schematic diagram of an embodiment of a membrane-based system, as described herein.

Turning now to FIG. 3, a schematic diagram of an exemplary membrane-based system 300 is provided. Specifically, a membrane-based system 300 comprises an aqueous solution injection well 310 within a reactive rock formation 312, wherein the aqueous solution injection well 310 comprises a casing portion 314 and an open hole interval portion 316. A diffusion-based membrane 318 comprising a gas portion 320 and a liquid portion 322 is positioned within a pressurized flow-vessel 323 above a surface 324 of the formation. A gas stream 326 from a gas source 328 is transported into the gas portion 320 of the diffusion-based membrane 318 using a gas pump 330. The gas stream 326 travels through a pipe 332 fluidly connected to the gas portion 320 the diffusion-based membrane 318. A water pump 334 is used to pump an aqueous solution 336 within a water well 338 to the liquid portion 322 of the diffusion-based membrane 318. The gas from the gas stream 326 is concentrated in the gas portion 320 of the diffusion-based membrane 318 to form a concentrated gas. At least a portion of the concentrated gas flows out of the gas portion 320 of the diffusion-based membrane 318 and flows into the liquid portion 322 of the diffusion-based membrane 318. At least a portion of the concentrated gas is dissolved in the aqueous solution to form a dissolved gas solution 340 within the liquid portion 322 of the diffusion-based membrane 318. The dissolved gas solution 340 then flows out of the liquid portion 322 of the diffusion-based membrane 318 and is then transported into the aqueous solution injection well 310 and flows into the reactive rock formation 312 through the open hole interval portion 316 of the aqueous solution injection well 310. The dissolved gas solution may interact with reactive minerals 342 in the rock formation 312 to form secondary minerals such as, but not limited to, carbonates 344.

The wellbore may include at least a portion of a fluid conduit (not shown) that links the interior of the wellbore to the surface. The fluid conduit connecting the interior of the wellbore to the surface may be capable of permitting regulated fluid flow from the interior of the wellbore to the surface or from the surface to the interior of the wellbore. The fluid conduit may permit access between equipment on the surface and the interior of the wellbore. Example equipment connected at the surface to the fluid conduit includes pipelines, tanks, pumps, and compressors. The fluid conduit may be large enough to permit introduction and removal of mechanical devices, including but not limited to tools, drill strings, sensors, and instruments, into and out of the interior of the well bore.

In one or more embodiments, the cased portion of the aqueous solution injection well may comprise cement, metal, nonmetallics, or a combination of two or more thereof. In one or more embodiments, the cased portion of the aqueous solution injection well may further comprise other equipment, such as but not limited to, packers, spacers. In one or more embodiments, the cased portion of the aqueous solution injection well may be operable to prevent fluid flow from the aqueous solution injection well into the surrounding formation.

In one or more embodiments, the open hole interval portion of the aqueous solution injection well may be operable to allow fluids within the aqueous solution injection well to flow out of the aqueous solution injection well and flow into the surrounding formation. In one or more embodiments, the open hole interval portion may be absent of any casings, liners, or cement. In other embodiments, the open hole interval portion may include additional support structures, such as slotted liners, casings, or even cement portions. Without being bound by any theory, it is believed that the additional support structures may improve the structural integrity of the open hole interval portion, which may increase the length of time the aqueous injection well may be used without repair.

In one or more embodiments, the membrane-based system may include a diffusion-based membrane. The diffusion-based membrane may be a single-component membrane, a selective multicomponent membrane, or combinations of these. In one or more embodiments, the diffusion-based membrane may comprise a gas portion and a liquid portion. The gas portion of the diffusion-based membrane may be equipped to receive gas from a gas source. The liquid portion of the diffusion-based membrane may be equipped to receive an aqueous solution.

In one or more embodiments, the gas from the gas source may be concentrated in the gas portion of the membrane to form a concentrated gas solution. In one or more embodiments, the concentrated gas solution may diffuse from the gas portion of the membrane to the liquid portion of the membrane. In one or more embodiments, the concentrated gas may dissolve in the aqueous solution in the liquid portion of the membrane, and then the dissolved gas may be carried with the aqueous solution to the formation. Without be bound by any particular theory, it is believed that the gas may diffuse from the gas portion of the membrane to the liquid portion of the membrane, driven by a gas phase concentration gradient between the gas portion and the liquid portion of the diffusion-based membrane. Further, once the gas diffuses and enters the liquid portion of the membrane, soluble diffused gases may be dissolved in the aqueous as the soluble diffused gases come in contact with the aqueous solution. It is believed that dissolution of the soluble diffused gases into the flowing aqueous solution keeps the soluble gas concentration low at the liquid portion of the diffusion-based membrane, which may create a local concentration gradient within the diffusion-based membrane and drive the diffusion process between the gas portion and liquid portion of the membrane.

In some embodiments, insoluble gases may diffuse through the membrane. However, as these gases don't dissolve in the aqueous solution, no concentration gradient is created. Without being bound by any particular theory, it is believed that the concentration of the insoluble gases reach equilibrium inside the membrane, and diffusion may of insoluble gases may be stopped or reduced.

In one or more embodiments, the membrane may comprise a hollow fiber of spiral wound membranes. Hollow fibers may be tubes made of the membrane material. In one or more embodiments, the gas may flow inside the tube and the water may flow outside the tube. The gas may diffuse from inside the tube and may dissolve at the surface outside the tube when it contacts the aqueous solution. In one or more embodiments, the thickness of the tube, where the gas diffusion may occur is called a "membrane wall". In one or more embodiments, the hollow fiber comprising the spiral wound membranes may be combined sheets of membrane, layered with highly porous support plates to allow the flow of gas in one portion of the membrane and the flow of liquid in another portion of the membrane. In one or more embodiments, multiple layers of the membrane sheets and spacers may be rolled into one cylindrical unit. In one or more embodiments, two or more hollow fibers may be connected. Exemplary examples of diffusion-based membranes may be gas permeable thin silicone or polydimethylsiloxane (PDMS) membranes.

In one or more embodiments, the liquid portion of the diffusion-based membrane may be fluidly connected to the formation. As used in this disclosure, the term "fluidly connected" may refer to a configuration wherein fluids may flow from one component to another, but they need not be directly connected together. Without intending to be bound by any particular theory, it is believed that the aqueous solution in the liquid portion of the diffusion-based membrane, may carry a dissolved gas from the wellbore to the formation. As injection of the aqueous solution continues, the dissolved gas may be carried further into the formation where it reacts or it may migrate further into the formation. Accordingly, the mass transfer mechanism for the dissolved gas in the aqueous solution is believed to be advection and the mass transfer mechanism may be dependent on the water pumping rate.

In one or more embodiments, the diffusion-based membrane of the membrane-based system may be positioned within the cased portion of the aqueous solution injection well. Without being bound by any particular theory, it is believed that if the injectivity of the well is low, a longer diffusion-based membrane may not be necessary. As such, the membrane may be positioned within the cased portion of the well.

In one or more embodiments, the diffusion-based membrane of the membrane-based system may be positioned within the open hole interval portion of the aqueous solution injection well. Without intending to be bound by any particular theory, it is believed that the positioning of the diffusion-based membrane within the open hole interval portion of the aqueous solution injection well may allow for higher gas solubility, within solubility limits, as the membrane is deeper in the well and the pressure and temperature may be higher than a less deep position in the aqueous solution injection well.

In one or more embodiments, the diffusion-based membrane of the membrane-based system may be positioned within both the cased portion and the open hole interval portion of the aqueous solution injection well. When the flow rate, or injectivity, of the aqueous solution is high, it may be advantageous for the length of the diffusion-based membrane to be positioned within both the cased portion and the open hole interval portion of the aqueous injection well to accommodate the higher volume of aqueous solution. Without being bound by any particular theory, it is believed that a longer membrane spanning both the cased portion and the open hole interval portion may allow for an increased mass transfer rate of gas into the carrier water and thus into the formation.

In one or more embodiments, the diffusion-based membrane of the membrane-based system may be positioned above the surface of the aqueous solution injection well. In one or more embodiments, the diffusion-based membrane above the surface of the aqueous solution injection well may be enclosed in a pressurized flow-through vessel.

In one or more embodiments, the membrane-based system comprises a gas from a gas source. In one or more embodiments, the gas is a gas mixture from a gas source, such as stack emissions. In one or more embodiments, a gas pump directs the gas into the aqueous solution injection well. In one or more embodiments, a gas pump concentrates the gas and directs it into the aqueous solution injection well. In one or more embodiments, the gas is directed into the aqueous solution injection well from a feed gas stream. As used in this disclosure, the term "feed gas stream" may refer to the composition of gases transported to the membrane-based system. In one or more embodiments, a gas pump directs the gas into the gas portion of the diffusion-based membrane positioned within the aqueous solution injection well. In one or more embodiments, a gas pump directs the gas into the interior gas portion of the diffusion-based membrane that is positioned above the surface of the formation and in the pressurized flow-through vessel. In one or more embodiments, the gas is transported through a pipe and the pipe has an opening wherein the gas may exit the pipe within the gas portion of the diffusion-based membrane.

In one or more embodiments, the gas from the gas source comprises $CO_2$. In one or more embodiments the gas source comprises $CO_2$. In one or more embodiments, the gas from the gas source is $CO_2$. In one or more embodiments, the gas source is $CO_2$.

In one or more embodiments, the gas from the gas source comprises $H_2S$. In one or more embodiments the gas source comprises $H_2S$. In one or more embodiments, the gas from the gas source is $H_2S$. In one or more embodiments, the gas source is $H_2S$.

In one or more embodiments, the gas from the gas source comprises $SO_2$. In one or more embodiments the gas source comprises $SO_2$. In one or more embodiments, the gas from the gas source is $SO_2$. In one or more embodiments, the gas source is $SO_2$.

In one or more embodiments, the gas from the gas source comprises $CO_2$ and $H_2S$. In one or more embodiments the gas source comprises $CO_2$ and $H_2S$. In one or more embodiments, the gas from the gas source consists of $CO_2$ and $H_2S$. In one or more embodiments, the gas source consists of $CO_2$ and $H_2S$.

In one or more embodiments, the gas from the gas source is selected from the group consisting of $CO_2$, $H_2S$, $SO_2$, and combinations of these.

In one or more embodiments, the membrane-based system further comprises a gas filter or gas separator to concentrate the desired gas from the gas source before introducing the gas to the diffusion-based membrane. Examples of suitable filter or separation techniques include, but are not limited to cyclones, baghouses, electrostatic precipitators, scrubbers, or combinations of two or more thereof.

In one or more embodiments, the membrane-based system comprises an aqueous solution from an aqueous solution source. In one or more embodiments, a water pump directs the aqueous solution into the aqueous solution injection well. In one or more embodiments, the water pump directs the aqueous solution into the casing of the aqueous solution injection well. In one or more embodiments, the pump directs the aqueous solution into the diffusion-based membrane. In one or more embodiments, the water pump directs the aqueous solution into the liquid portion of the diffusion-based membrane. In one or more embodiments, the rate of aqueous solution flow into the aqueous solution injection well or the liquid portion of the membrane-based system is changed based on the desired flow rate of the aqueous solution.

In one or more embodiments, the aqueous solution source originates from the same zone within the formation in which the aqueous solution injection well is located. Without intending to be bound by any particular theory, it is believed that if the aqueous solution source originates within the same zone within the formation, it may eliminate potential incompatibility issues such as scaling that could interfere with gas uptake and injectivity. Further, it is believed that sourcing the aqueous solution for the membrane-based system from the formation may prevent reservoir overpressure and undesired fluid migration out of the injection zone. Additionally, it is believed that sourcing the aqueous solution for the membrane-based system from the formation may improve monitoring of gas sequestration in the formation, as the composition of the recycled aqueous solution could be monitored.

In one or more embodiments, the aqueous solution source may be a well identical to the aqueous solution injection well in terms of mechanical properties, equipment, and completion. In one or more embodiments, the aqueous solution source may be a well differing from the aqueous solution injection well in terms of mechanical properties, equipment, and completion. For instance, the aqueous solution source may be any well producing water. In one or more embodiments, the aqueous solution source may be operable to receive an injection of a waste solution from the aqueous solution injection well. Without intending to be bound by any particular theory, it is believed that a membrane-based system for transporting dissolved gases to a formation may be more efficient if the waste solution from the aqueous solution injection well may be recycled back to the aqueous solution source.

In one or more embodiments, the membrane-based system may be configured to operate gas transfer under countercurrent conditions, cocurrent conditions, or a combination thereof.

In one or more embodiments, the aqueous solution is introduced at one end of the diffusion-based membrane, and the gas is introduced at an opposite end of the diffusion-based membrane such that the gas flows against the aqueous solution flow under countercurrent conditions. As used throughout the disclosure, the term "countercurrent" or "countercurrent conditions" may refer to such embodiments wherein the gas flow and aqueous solution flow are introduced in a manner that results in the gas flow and aqueous solution flow originating in opposing portions of the diffusion-based membrane, separated by the membrane.

In one or more embodiments, the diffusion-based membrane is positioned within the aqueous solution injection well and the membrane-based system is configured under countercurrent conditions, wherein the gas is transported through the pipe and exits the pipe at a lower portion of the gas portion of the diffusion-based membrane within the aqueous solution injection well, such as the lower 50% of the diffusion-based membrane to the end distal to the wellbore opening based on the total length of the membrane. In one or more embodiments, the gas exits the pipe at the gas portion of the diffusion-based membrane at the lower 50%, 45%, 40%, 35%, 30%, 25%, 20%, 15%, 10%, 5%, or 1% of the end distal to the wellbore opening based on the total length of the membrane. In one or more embodiments, the gas is transported through the pipe and exits the pipe at a lowest portion of the gas portion of the diffusion-based membrane within the aqueous solution injection well to the end distal to the wellbore opening. Without intending to be bound by any particular theory, it is believed that the aqueous solution flows down into the well and contacts the tail end of the gas stream, resulting in a more stable concentration gradient over the length of the membrane-based system and a higher gas transfer efficiency.

In one or more embodiments, the diffusion-based membrane is positioned above the surface in a pressurized flow-through vessel, and the membrane-based system is configured under countercurrent conditions including introducing the gas into the gas portion of the diffusion-based membrane at one end of the diffusion-based membrane, and introducing aqueous solution into the diffusion-based membrane at the opposing end of the membrane in relation to the gas introduction, such that the gas is dissolved in the aqueous solution to form a dissolved gas solution. The dissolved gas solution is then introduced to the aqueous solution injection well. Without intending to be bound by any particular theory, it is believed that the countercurrent conditions may maintain a concentration gradient for the mass transfer to occur along the entire exchange portion of the well.

In one or more embodiments, the aqueous solution and the gas are introduced at a similar portion of the diffusion-based membrane, such that the gas initially flows in the same direction that the aqueous solution flows under cocurrent conditions. As used throughout the disclosure, the term "cocurrent" or "cocurrent conditions" may refer to such embodiments wherein the gas flow and aqueous solution flow are introduced in a manner that results in the gas flow and aqueous solution flow originating in a similar portion of the diffusion-based membrane.

In one or more embodiments, the diffusion-based membrane is positioned within the aqueous solution injection well and the membrane-based system is configured under cocurrent conditions, wherein the gas is transported through the pipe and exits the pipe at a higher portion of the diffusion-based membrane within the aqueous solution injection well, such as the upper 50% of the diffusion-based membrane to the end proximal to the wellbore opening based on the total length of the membrane. In one or more embodiments, the gas exits the pipe at the gas portion of the diffusion-based membrane at the upper 50%, 45%, 40%, 35%, 30%, 25%, 20%, 15%, 10%, 5%, or 1% to the end proximal to the wellbore opening based on the total length of the membrane. In one or more embodiments, the gas is transported through the pipe and exits the pipe at the highest portion of the diffusion-based membrane within the aqueous solution injection well to the end proximal to the wellbore opening. In one or more embodiments, under cocurrent conditions, the gas and aqueous solution flow down into the well in the same direction toward the end of the well. Without intending to be bound by any particular theory, it is believed that the cocurrent conditions may initially result in the gas at its highest concentration within the diffusion-based membrane and the aqueous solution at its lowest concentration of the dissolved gas, thus maximizing the concentration gradient and facilitating a higher mass transfer rate compared to countercurrent conditions.

In one or more embodiments, the diffusion-based membrane is positioned above the surface in a pressurized flow-through vessel, and the membrane-based system is configured under cocurrent conditions including introducing the gas into the diffusion-based membrane at one end of the diffusion-based membrane, and introducing aqueous solution into the diffusion-based membrane near the same end of the membrane in relation to the gas introduction. Without intending to be bound by any particular theory, it is believed that the cocurrent conditions may initially result in the gas at its highest concentration within the diffusion-based membrane and the aqueous solution at its lowest concentration of the dissolved gas, thus maximizing the concentration gradient and facilitating a higher mass transfer rate compared to countercurrent conditions.

In one or more embodiments, the membrane-based system may comprise a configuration wherein the gas is introduced to the aqueous solution in the diffusion-based membrane under a combination of countercurrent and cocurrent conditions described previously. For example, in one or more embodiments, a cocurrent system may be used for a part of the well further from the surface, to facilitate high mass transfer rate. A countercurrent system may be simultaneously used to transport a return gas, which has low concentration of the desired gas at a part of the well closer to the surface to facilitate higher removal efficiency.

In one or more embodiments, the membrane-based system further comprises a gas return pipe. As used throughout this disclosure, the term "gas return pipe" may refer to a pipe that is fluidly connected to the aqueous solution injection well and the surface of the formation, allowing for insoluble or undissolved gases in the membrane-based system to be transported out of the aqueous solution injection well. In one or more embodiments, the insoluble or undissolved gases may originate from the gas transported to the diffusion-based membrane One or more embodiments of the membrane-based system also include modular components. Suitable modular components include one or more, but not limited to the following: pipes, membrane elements, protective casings, and protective liners. One advantage of having a modular membrane system is that it may be easier to extract individual modules for maintenance or replacement.

In one or more embodiments, the driving force of the membrane-based system may be generated by the concentration gradient, which transfers the gas, such as but not limited to $CO_2$, $H_2S$, and $SO_2$, out of the gas portion of the diffusion-based membrane and into the liquid portion of the diffusion-based membrane. As used herein the term "concentration gradient" refers to the gradual change in the concentration of solutes in a solution as a function of distance through a solution. Without intending to be bound by any particular theory, it is believed that several factors affect the mass transfer rate. It is further believed that these factors include the diffusion gradient inside the membrane (intermembrane diffusion) as well as the gradient in the film that forms at the surface of the membrane. As the diffusion gradient increases, the mass transfer rate may increase. The rate of solubility of the gas in the aqueous fluid on the outside of the membrane may be another factor that affects the mass transfer rate; as the rate of the solubility of the gas in the aqueous fluid on the outside of the membrane increases, the mass transfer rate may increase. The intermembrane diffusion rate may be governed by the membrane diffusion coefficient and the concentration gradient between the gas inside the membrane and the concentration at the exterior surface of the membrane. As the intermembrane diffusion rate increase, the mass transfer rate may increase. The film diffusion rate may be affected by the diffusivity of dissolved gas in the aqueous solution. As the diffusivity of gas in aqueous solution increases, the rate of mass transfer may increase. The liquid phase concentration gradient may be affected by the advective transport of the aqueous solution which is governed by the water velocity, the water injection rate, or a combination thereof. As the liquid phase concentration gradient increases, the rate of mass transfer may increase. As the reaction rates at the active reaction zones within the formation increase, the mass transfer rate may increase. As used herein, the term "advective transport" may refer to the transport of a substance or material by bulk motion of a fluid. Gas to $H_2O$ mass transfer will continue for as long as the concentration gradient is maintained between the gas portion of the diffusion-based membrane and the liquid portion of the membrane.

In one or more embodiments, the membrane-based system may be configured to operate under cocurrent conditions, countercurrent conditions, or a combination thereof based on factors such as the pressure, temperature, and composition (PTX) conditions of the operation or physical properties of the reservoir such as, but not limited to, porosity, permeability, or volume. For example, in embodiments where the permeability is low, it may be advantageous to configure the membrane-based system to operate under countercurrent conditions to ensure the highest possible $CO_2$ removal efficiency and simplify the surface facilities. Without intending to be bound by any particular theory, it is believed that under conditions where a system is operating under favorable PTX and high permeability, it may be advantageous to operate in cocurrent conditions and design for maximum mass transfer rate to sequester higher masses of $CO_2$ in a given time. However, in cocurrent operation the return gas may still have significant $CO_2$ concentration that may be enriched at the surface and reinjected into the gas portion of the diffusion-based membrane. Accordingly, the designer may choose the most cost-effective approach by balancing the number of injection wells (determined by PTX properties and permeability) against the cost of $CO_2$ processing and enrichment facilities at the surface of the formation.

In one or more embodiments, the gas is pumped into the gas portion of the diffusion-based membrane within the casing of the aqueous solution injection well and an aqueous solution is simultaneously pumped into the aqueous solution injection well such that at least a portion of the aqueous solution enters the liquid portion of the diffusion-based membrane. The gas and aqueous solution are independently pumped into the aqueous solution injection well at a controlled rate to ensure efficient advective transport to carry dissolved gas into the formation. In one or more embodiments, the dissolved gas comprises $CO_2$ and is transported inside a rock reservoir for mineral carbonation.

In one or more embodiments, the dissolved gas solution within the diffusion-based membrane flows out of the membrane and exits the aqueous solution injection well through the open-hole portion of the aqueous solution injection well and flows into the surrounding formation.

In one or more embodiments, the gas is pumped into the diffusion-based membrane positioned above the surface of the formation within a pressurized flow-through vessel and an aqueous solution is simultaneously pumped into the diffusion-based membrane to produce a dissolved gas solution. In one or more embodiments, the dissolved gas solution is then transported into the aqueous solution injection well and exits the aqueous solution injection well through the open-hole portion of the aqueous solution injection well and flows into the surrounding formation.

In one or more embodiments, the outside portion of the membrane may be flushed with a gas-unsaturated aqueous solution. Without intending to be bound by any particular theory, it is believed that continuously flushing the outer portion of the diffusion-based membrane with water or an aqueous solution may increase the mass transfer rate of gas into the formation. Further, it is believed that the aqueous solution used to flush the outer portion of the diffusion-based membrane with lower dissolved gas content may result in a greater mass transfer rate.

In one or more embodiments, the gas in the dissolved gas solution may be secured within the formation through mineral trapping. As used in this disclosure, the term "mineral trapping" may refer to the reaction of gas in a solution with other materials in the formation to form minerals. In one or more embodiments, the gas in the dissolved gas solution may be $CO_2$. Without intending to be bound by any particular theory, it is believed that when $CO_2$ dissolves in water to form a solution, carbonic acid is formed in the solution, and the carbonic acid may interact with the surrounding formation to form carbonates. It is further believed that the formed carbonates are stable and may effectively trap the $CO_2$ within the formation.

In one or more embodiments, the gas in the dissolved gas solution may be secured within the formation through solubility trapping. As used in this disclosure, the term "solubility trapping" may refer to storing gases dissolved in water in the interstitial spaces of formations of different mineral compositions including, but not limited to, basalts, ultramafic rocks, granite, sandstones, conglomerates, shales and any other porous rocks. The term "solubility trapping" may also refer to the sinking of gas-rich solutions towards the bottom of a formation or a reservoir, displacing the less dense, gas-poor ambient formation waters. In one or more embodiments, the gas in the dissolved gas solution may be $CO_2$. Without intending to be bound by any particular theory, it is believed that when $CO_2$ or other gas dissolves in water to form a gas-rich solution, the density of the gas-rich solution will be greater than other surrounding fluids in the formation or reservoir and will sink to the bottom of the formation over time, trapping the gas in a solution within the formation.

In one or more embodiments, the membrane-based system may be applied either as a standalone method or in combination with other methods that facilitate $CO_2$ dissolution by increasing the $CO_2$ content in gas mixtures, separating undesired impurities, modifying carrier water PTX properties, or a combination of two or more thereof. Non-limiting examples to modify the pressure, temperature, composition, or combinations thereof of the aqueous solution may be include target gas enrichment methods such as amine absorption/adsorption, pressure swing adsorption, cryogenic separation, or other methods that may result in a change of the PTX properties of the aqueous solution.

Some embodiments disclosed herein are directed to a method for increasing a mass transfer rate of a gas in a formation in the membrane-based system, wherein the membrane based-system may comprise any of the embodiments disclosed herein.

In one or more embodiments, the method comprises dissolving the gas in the aqueous solution within the liquid portion of the diffusion-based membrane. In one or more embodiments, the gas is dissolved in the aqueous solution to form a dissolved gas solution and the dissolved gas solution is present within the liquid portion of the diffusion-based membrane.

In one or more embodiments, the method comprises transporting the dissolved gas solution in the liquid portion of the diffusion-based membrane to the formation. In one or more embodiments, the dissolved gas solution flows out of the liquid portion of the diffusion-based membrane and into the aqueous injection well, where the dissolved gas solution may flow into the formation through the open hole interval portion of the aqueous injection well. Without intending to be bound by any particular theory, it is believed that continuous aqueous solution flow into the liquid portion of the diffusion-based membrane may result in a greater mass transfer rate of the concentrated gas from the gas portion of the diffusion-based membrane into the formation.

In one or more embodiments, the method comprises monitoring a composition of the undissolved gases transported out of the gas portion of the diffusion-based membrane. In one or more embodiments, a gas mixture comprising the insoluble gases and undissolved gases may flow out of the gas portion of the diffusion-based membrane through the gas return pipe and exit above the surface of the formation. In one or more embodiments, the composition of the undissolved gases flowing out of the formation through the gas return pipe may be monitored to assess the efficiency of gas dissolution to the aqueous solution in the formation. Without intending to be bound by any particular theory, it is believed that a greater amount of undissolved gases detected at the gas return pipe end above the surface of the formation suggests less efficient dissolution of gas in the dissolved gas solution.

In one or more embodiments, the insoluble gases may comprise $N_2$. In one or more embodiments, a portion of the gas from the gas source may include insoluble gases to maintain a desired pressured within the diffusion-based membrane. For instance, a high differential pressure between the diffusion-based membrane and the outside of the membrane, or a high differential pressure between two or more portions of the membrane may result in collapse of the membrane.

In one or more embodiments, the undissolved gases may comprise $CO_2$, $H_2S$, $SO_2$, $O_2$, $Ar_2$ or combinations of these. In one or more embodiments, $Ar_2$ may be added to the gas portion of the diffusion-based membrane to monitor the rate of mass transfer. For instance, $Ar_2$ is soluble and inert, so monitoring the $Ar_2$ concentration may provide a mass transfer rate independent of the formation reactivity.

In one or more embodiments, the method may comprise monitoring a composition of aqueous solution within the formation. In embodiments, the aqueous solution within the formation may be transported to the surface as a return water stream and the composition of the return water stream may be analyzed. For example, the detection of dissolved $CO_2$ in the return water stream may indicate the plume of $CO_2$-rich water started to reach the producer/monitoring well. By monitoring the rate of increase in the dissolved $CO_2$ concentration in the return water stream, a determination of the remaining formation capacity for additional $CO_2$ may be made. Further, a determination of the time point where it may be more economically advantageous to move to another injection well may be made. Additionally, when transporting $CO_2$-rich water into reactive formations, the concentration of $CO_2$ in the diffusion-based membrane may be changed by adjusting the gas source settings, gas pump settings, or a combination of the gas source and gas pump settings. The concentration of $CO_2$ in the diffusion-based membrane may be changed to adjust the mass transfer rate of $CO_2$ in the formation and allow for the continued precipitation of secondary minerals to take place even after dissolved $CO_2$ is detected in the return water stream in order to utilize more capacity of the formation.

In one or more embodiments, the flow rate of the gas, the flow rate of the aqueous solution, the pressure of the gas, the pressure of the aqueous solution, the gas concentration in the gas stream or combination of these may be independently changed so as to increase a concentration of gas in the dissolved gas solution, as determined by the monitoring of the composition of the gas transported through the gas return pipe. In one or more embodiments, the composition of the aqueous solution within the formation may also be monitored to inform what flow rate adjustments might be made to increase the concentration of the gas in the dissolved gas solution. In one or more embodiments, monitoring of the reaction rates and byproducts is achieved by measuring the compositions of vented gas and aqueous solution that is recycled in the process.

In one or more embodiments, the dissolved gas solution reacts with minerals in the formation to form secondary minerals. In one or more embodiments, the dissolved gas solution comprises $CO_2$ and the dissolved gas solution reacts with minerals in the formation to form secondary minerals such as carbonates. In one or more embodiments, the dissolved gas solution comprises $H_2S$ and the dissolved gas solution reacts with minerals in the formation to form secondary minerals such as sulfides.

In one or more embodiments, the mass-transfer rate of the gas in the formation may be increased by changing the operation conditions. Without intending to be bound by any particular theory, it is believed that the mass-transfer rate is dependent on the gas concentration in the feed gas stream, aqueous solution pumping rate, the permeability of the membrane, and the pressure, the temperature and the composition of the aqueous solution used for injection. For instance, if the concentration of the gas in the gas stream is increased, the mass transfer rate of said gas into the formation may increase. If the aqueous solution pumping rate increases, the mass transfer rate of the gas into the formation may increase as this may increase the concentration gradient between the gas portion and the liquid portion of the diffusion-based membrane. As the permeability of the membrane increases, the mass transfer rate of the gas into the formation may increase. As pressure, temperature, or both pressure and temperature of the aqueous solution used for injection increases, the mass transfer rate of the gas into the formation may increase.

In one or more embodiments, the dissolved gas solution comprises hydrogen sulfide.

In one or more embodiments, the dissolved gas solution comprises sulfur dioxide.

Embodiments herein may be useful over a wide range of formation conditions, including temperatures from 10° C. to 300° C., and pressures from 100 kilopascals (kPa) to less than 9000 kPa, for example. Without intending to be bound by any particular theory, it is believed that at temperatures below 10° C., $CO_2$ may react with water to form a waxy substance called clathrate that may significantly reduce formation porosity and decrease injectivity. Further, it is believed that at temperatures above 300° C., calcite may be unstable, breaking down to form wollastonite and $CO_2$, thus reducing the mass of $CO_2$ captured in the formation. Further, it is believed that at pressures below 100 kPa, $CO_2$ saturation concentrations are too low for economical mass transfer. Additionally, at pressures above 9000 kPa, $CO_2$ may form a single-phase supercritical liquid and would not be able to pass through a diffusion-based membrane.

Advantages of some embodiments disclosed herein include, but are not limited to optimization of the dissolution of gases, such as but not limited to $CO_2$, hydrogen sulfide ($H_2S$), sulfur dioxide ($SO_2$), or mixtures thereof, in aqueous solution for the purpose of gas sequestration in a mineral formation; reduction of the energy cost of compressing $CO_2$ or $CO_2$ mixtures, while maintaining the same level of gas concentration in the aqueous solution; optimization of $CO_2$ or other gas uptake in a formation using an open hole interval in the aqueous solution injection well; reduction of the carrier aqueous solution injection volume required; improved process rate control and efficiency by monitoring return gas composition and return aqueous solution stream composition; and reduction of the risk of injection issues and/or $CO_2$ leaks caused by incomplete $CO_2$ dissolution.

According to an aspect, either alone or in combination with any other aspect, a membrane-based system for transporting dissolved gases to a formation includes an aqueous solution injection well within the formation, a diffusion-based membrane comprising a gas portion and a liquid portion, a gas from a gas source, and an aqueous solution from an aqueous solution source. The aqueous solution injection well includes a cased portion and an open hole interval portion. Fluids within the aqueous solution injection well flow out of the aqueous solution injection well and flow into the formation through the open hole interval portion. A gas pump transports the gas into the gas portion of the diffusion-based membrane and the gas is concentrated in the gas portion of the diffusion-based membrane to form a concentrated gas. A water pump transports the aqueous solution into the cased portion of the aqueous solution injection well. At least a portion of the aqueous solution enters the liquid portion of the diffusion-based membrane. At least a portion of the concentrated gas flows out of the gas portion of the diffusion-based membrane and flows into the liquid portion of the diffusion-based membrane. At least a portion of the concentrated gas is dissolved in the aqueous solution to form a dissolved gas solution within liquid portion of the diffusion-based membrane, and the dissolved gas solution flows out of the liquid portion of the diffusion-based membrane and into the formation.

According to a second aspect, either alone or in combination with any other aspect, the diffusion-based membrane is positioned within the cased portion of the aqueous solution injection well and the gas is transported into a pipe within the aqueous solution injection well.

According to a third aspect, either alone or in combination with any other aspect, the diffusion-based membrane is positioned within the open hole interval portion of the aqueous solution injection well and the gas is transported into a pipe within the aqueous solution injection well.

According to a fourth aspect, either alone or in combination with any other aspect, the diffusion-based membrane is positioned above a surface of the formation and enclosed in a pressurized flow-through vessel.

According to a fifth aspect, either alone or in combination with any other aspect, the gas from the gas source comprises carbon dioxide.

According to a sixth aspect, either alone or in combination with any other aspect, the gas from the gas source is selected from the group consisting of carbon dioxide, hydrogen sulfide, sulfur dioxide, and combinations thereof.

According to a seventh aspect, either alone or in combination with any other aspect, the aqueous solution from the aqueous solution source is within the formation.

According to an eighth aspect, either alone or in combination with any other aspect, the system further comprises a gas return pipe, wherein insoluble or undissolved gases within the aqueous solution injection well are transported to an atmosphere outside of the aqueous solution injection well.

According to a ninth aspect, either alone or in combination with any other aspect, the gas from the gas source includes carbon dioxide and the dissolved gas solution that flows out of the liquid portion of the diffusion-based membrane and into the formation reacts with minerals in the formation to form carbonates.

According to a tenth aspect, either alone or in combination with any other aspect, a membrane-based system for transporting dissolved gases to a formation includes an aqueous solution injection well within the formation, a diffusion-based membrane comprising a gas portion and a liquid portion, a gas in the gas portion of the diffusion-based membrane, an aqueous solution, and a gas return pipe from which insoluble and undissolved gases within the gas portion of the diffusion-based membrane are transported to the atmosphere outside of the aqueous solution injection well. The aqueous solution injection well includes a cased portion and an open hole interval portion. Fluids within the aqueous solution injection well flow out of the aqueous solution injection well and flow into the formation through the open hole interval portion. A method for increasing a mass transfer rate of a gas in a formation in the membrane-based system includes dissolving the gas in the aqueous solution within the liquid portion of the diffusion-based membrane, thereby forming a dissolved gas solution; transporting the dissolved gas solution within the liquid portion of the diffusion-based membrane to the formation; monitoring a composition of the undissolved gases transported out of the gas portion of the diffusion-based membrane through the gas return pipe, or monitoring a composition of aqueous solution within the formation, or a combination of these; and, changing a gas flow rate of the gas into the gas portion of the diffusion-based membrane and an aqueous solution flow rate of the aqueous solution into the aqueous solution injection well to increase a concentration of the dissolved gas solution, as determined by the monitoring of the undissolved gas transported through the gas return pipe; thereby increasing the mass transfer rate of the gas in the formation.

According to an eleventh aspect, either alone or in combination with any other aspect, the diffusion-based membrane is positioned within the cased portion of the aqueous solution injection well and the gas is transported into a pipe within the aqueous solution injection well.

According to a twelfth aspect, either alone or in combination with any other aspect, the diffusion-based membrane is positioned within the open hole interval portion of the aqueous solution injection well and the gas is transported into a pipe within the aqueous solution injection well.

According to a thirteenth aspect, either alone or in combination with any other aspect, the diffusion-based membrane is positioned within the cased portion and open hole interval portion of the aqueous solution injection well and the gas is transported into a pipe within the aqueous solution injection well.

According to a fourteenth aspect, either alone or in combination with any other aspect, the diffusion-based membrane is positioned above a surface of the formation and enclosed in a pressurized flow-through vessel.

According to a fifteenth aspect, either alone or in combination with any other aspect, the dissolved gas solution comprises carbon dioxide and the dissolved gas solution reacts with minerals in the formation to form carbonates.

According to a sixteenth aspect, either alone or in combination with any other aspect, the dissolved gas solution comprises hydrogen sulfide.

According to an seventeenth aspect, either alone or in combination with any other aspect, the dissolved gas solution comprises sulfur dioxide.

It will be apparent to persons of ordinary skill in the art that various modifications and variations can be made without departing from the scope disclosed herein. Since modifications, combinations, sub-combinations, and variations of the disclosed embodiments, which incorporate the spirit and substance disclosed herein, may occur to persons of ordinary skill in the art, the scope disclosed herein should be construed to include everything within the scope of the appended claims and their equivalents.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter disclosed herein has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A membrane-based system for transporting dissolved gases to a formation, said membrane-based system comprising:
   an aqueous solution injection well within the formation, comprising a casing and an open hole interval, wherein fluids within the aqueous solution injection well flow out of the aqueous solution injection well and flow into the formation through the open hole interval;
   a diffusion-based membrane comprising a gas side and a liquid side;
   a gas from a gas source, wherein the gas source is outside of the formation, a gas pump transports the gas into the gas side of the diffusion-based membrane and the gas is concentrated in the gas side of the diffusion-based membrane to form a concentrated gas; and
   an aqueous solution from an aqueous solution source, wherein a water pump transports the aqueous solution into the casing of the aqueous solution injection well, wherein the aqueous solution enters the liquid side of the diffusion-based membrane;
   wherein the concentrated gas flows out of the gas side of the diffusion-based membrane and flows into the liquid side of the diffusion-based membrane; the concentrated gas is dissolved in the aqueous solution to form a dissolved gas solution within the liquid side of the diffusion-based membrane; the dissolved gas solution flows out of the liquid side of the diffusion-based membrane and into the formation.

2. The system of claim 1, wherein the diffusion-based membrane is positioned within the casing of the aqueous solution injection well and the gas is transported into a pipe within the aqueous solution injection well.

3. The system of claim 1, wherein the diffusion-based membrane is positioned within the open hole interval of the aqueous solution injection well and the gas is transported into a pipe within the aqueous solution injection well.

4. The system of claim 1, wherein the diffusion-based membrane is positioned above a surface of the formation and enclosed in a pressurized flow-through vessel.

5. The system of claim 1, wherein the gas from the gas source comprises carbon dioxide.

6. The system of claim 1, wherein the gas from the gas source is selected from the group consisting of carbon dioxide, hydrogen sulfide, sulfur dioxide, and combinations thereof.

7. The system of claim 1, wherein the aqueous solution source is within the formation.

8. The system of claim 1, further comprising a gas return pipe, wherein insoluble or undissolved gases within the aqueous solution injection well are transported to an atmosphere outside of the aqueous solution injection well.

9. The system of claim 1, wherein:
   the gas from the gas source comprises carbon dioxide; and
   the dissolved gas solution that flows out of the liquid side of the diffusion-based membrane and into the formation reacts with minerals in the formation to form carbonates.

10. A method for increasing a mass transfer rate of a gas in a formation in a membrane-based system, the membrane-based system comprising:
- an aqueous solution injection well within the formation, the aqueous solution injection well comprising a casing capable of holding an aqueous solution and an open hole interval, wherein fluids within the aqueous solution injection well flow out of the aqueous solution injection well and flow into the formation through the open hole interval;
- a diffusion-based membrane comprising a gas side and a liquid side;
- a gas in the gas side of the diffusion-based membrane;
- the aqueous solution; and
- a gas return pipe from which insoluble and undissolved gases within the gas side of the diffusion-based membrane are transported to the atmosphere outside of the aqueous solution injection well;

the method comprising:
- dissolving the gas in the aqueous solution within the liquid side of the diffusion-based membrane, thereby forming a dissolved gas solution;
- transporting the dissolved gas solution in the liquid side of the diffusion-based membrane to the formation, wherein the dissolved gas solution reacts with minerals in the formation to form carbonates, sulfides, or a combination of these, thereby sequestering the gas in the formation;
- monitoring a composition of the undissolved gases transported out of the gas side of the diffusion-based membrane through the gas return pipe, or monitoring a composition of the aqueous solution within the formation, or a combination of these; and
- increasing a gas flow rate of the gas into the gas side of the diffusion-based membrane, increasing an aqueous solution flow rate of the aqueous solution into the aqueous solution injection well, or a combination of these, to increase a concentration of the gas that is sequestered in the formation, as determined by the monitoring of the undissolved gas transported from the gas side of the diffusion-based membrane through the gas return pipe;
- thereby increasing a mass transfer rate of the gas that is sequestered in the formation.

11. The method of claim 10, wherein the diffusion-based membrane is positioned within the casing of the aqueous solution injection well and the gas is transported into a pipe within the aqueous solution injection well.

12. The method of claim 10, wherein the diffusion-based membrane is positioned within the open hole interval of the aqueous solution injection well and the gas is transported into a pipe within the aqueous solution injection well.

13. The method of claim 10, wherein the diffusion-based membrane is positioned within the casing and open hole interval of the aqueous solution injection well and the gas is transported into a pipe within the aqueous solution injection well.

14. The method of claim 10, wherein the diffusion-based membrane is positioned above a surface of the formation and enclosed in a pressurized flow-through vessel.

15. The method of claim 10, wherein the dissolved gas solution comprises carbon dioxide and the dissolved gas solution reacts with minerals in the formation to form carbonates.

16. The method of claim 10, wherein the dissolved gas solution comprises hydrogen sulfide and the dissolved gas solution reacts with minerals in the formation to form sulfides.

17. The method of claim 10, wherein the dissolved gas solution comprises sulfur dioxide.

18. The method of claim 10, wherein the gas in the gas side of the diffusion based membrane is from a gas source, and the gas source is outside of the formation.

19. The method of claim 10, wherein the aqueous solution source is within the formation.

\* \* \* \* \*

UNITED STATES PATENT AND TRADEMARK OFFICE
CERTIFICATE OF CORRECTION

Page 1 of 1

PATENT NO. : 11,598,187 B1
APPLICATION NO. : 17/573210
DATED : March 7, 2023
INVENTOR(S) : Zeyad Tareq Ahmed et al.

It is certified that error appears in the above-identified patent and that said Letters Patent is hereby corrected as shown below:

On the Title Page

(72) Inventors: Delete "Zeyad Tareq Ahmed, Chassell, MI (US); Serguey Viktorov Arkadakskiy, Alberta (CA); Noushad Kunnummal, Louisville, KY (US)" and insert -- Zeyad Tareq Ahmed, Dhahran (SA); Serguey Viktorov Arkadakskiy, Dhahran (SA); Noushad Kunnummal, Dhahran (SA) --, therefor.

Signed and Sealed this
Twenty-fourth Day of October, 2023

Katherine Kelly Vidal
*Director of the United States Patent and Trademark Office*